United States Patent [19]

Centea

[11] Patent Number: 5,092,492
[45] Date of Patent: Mar. 3, 1992

[54] LIQUID METERING, MIXING AND DISPENSING GUN

[75] Inventor: Mark E. Centea, Akron, Ohio

[73] Assignee: Liquid Control Corporation, North Canton, Ohio

[21] Appl. No.: 470,957

[22] Filed: Jan. 26, 1990

[51] Int. Cl.$^5$ .............................................. B67D 5/52
[52] U.S. Cl. .................................. 222/137; 222/145; 222/309; 222/334
[58] Field of Search ............... 222/135, 137, 145, 325, 222/334, 389, 488, 309

[56] References Cited

U.S. PATENT DOCUMENTS

| | | | |
|---|---|---|---|
| 1,949,497 | 3/1934 | Stafford et al. | 222/334 |
| 3,774,817 | 11/1973 | Whittaker | 222/334 |
| 4,342,310 | 8/1982 | Lindmayer et al. | 222/334 |
| 4,350,803 | 9/1982 | Penn | 528/10 |
| 4,826,050 | 5/1989 | Murphy et al. | 222/334 |
| 4,880,143 | 11/1989 | Murray | 222/135 |
| 4,901,888 | 2/1990 | Standlick | 222/145 |

OTHER PUBLICATIONS

Shotmatic Twin Model SMT 10, Iwashita Engineering, Inc. Catalog #D119(U.S.A.) Sep. 1986.
Chem-Mix Model 726 Epoxer Proportioning Dispenser Model 727-TM The Encapsulator.
Chem-Mix Model 705 ARP-All Pneumatic Dispensing System.
Portionator III, Glenmark Manufacturing Inc.
Micro-Mix A/B Meter/Mix Dispensing Systems Dosiertechnik & Pneumatic AG Sep. 1987.
Hibar Systems LTD Precision Metering & Dispensing Equipment Model: 2B-RV; 1B-CV; 4B-RV-E.
Mini-Variable Ratio Meter, Mix, Dispense Unit, Liquid Control Corp.
Twinmixer; Posimixer 60/40; Sep. 1, 1983, Liquid Control Corp.
Liquid Control Corp., Electrical Potting & Encapsulation Equipment 1988.
Precision Liquid Meter, Mix & Dispense System, Liquid Control Corp. 7/86.
Naka Seiki Co. Ltd., Kappa-2 Proportionate Metering Unit.

Primary Examiner—Michael S. Huppert
Assistant Examiner—Kenneth Bomberg
Attorney, Agent, or Firm—Michael Sand Co.

[57] ABSTRACT

A gun for metering, mixing and dispensing the components of a two-component liquid material. A pair of chambers each having front and rear compartments, communicate with the liquid materials contained in pressurized portable cartridges through liquid material inlet openings formed in the rear compartment of the chambers. A material passage opening allows for communication between the front and rear compartments of the chamber, and an aligned material outlet opening formed in the front compartment allows for passage of the material out of the gun. A pair of independently adjustable rods are slidably mounted in the rear compartment of their respective chambers. Pump means drive the rods between a positive displacement position wherein front ends of the rods are sealingly engaged with the material passage openings and extend into the front compartments of the chambers, and a retracted position wherein the front and rear compartments are allowed to communicate through the material passage opening. The pump means is driven by a portable compress pneumatic cartridge. A mechanical adjustment nut is operatively connected to the piston rod of the pump means for controlling the length of stroke of the attached positive displacement rods. Check valves mounted adjacent to the chamber outlet openings prevent unintended passage of liquid material out of or back through the outlet openings. Disposable static mixer means are mounted adjacent to the outlet opening for mixing the metered material to be dispensed.

7 Claims, 8 Drawing Sheets

LIQUID METERING, MIXING AND DISPENSING GUN

BACKGROUND OF THE INVENTION

1. Technical Field

The invention relates to dispensing equipment and in particular to a portable gun for dispensing metered and mixed plural component liquids. More particularly, the invention relates to such a portable dispensing gun for plural component liquids in which the plural components are metered and mixed adjacent to the point of dispensing.

2. Background Information

An ever-increasing number of products used in everyday life require the dispensing of liquid materials in one form or another for their manufacture. These liquids typically comprise two-component reactive resins, but one-part materials also are often used. The types of materials dispensed include virtually any movable liquid or paste such as epoxies, polyurethanes, silicones, polyesters, acrylics, polysulfides and phenolics. The processes in which such materials are used include filling precise amounts of mixed resin into molds, encapsulating electrical components with insulating resins, applying continuous beads of structural adhesives, injecting polyesters into closed molds, sealing joints with two-part polysulfides, and numerous other functions requiring accurate material control. Examples of product applications for these materials and processes include under-the-hood electronic assemblies and safety devices for the automotive industry; encapsulation of magnetic and other advanced electrical devices for the aerospace industry; component mounting, security potting and glob-top applications for circuit board assemblies; and switches, power supplies, heating assemblies and other electronic components for the appliance industry.

Thus, as the above-described materials continue to be consumed in increasing quantities, the demand for precision liquid dispensing equipment is also growing. The industry is continually searching for more reliable, efficient and accurate liquid metering, mixing and dispensing equipment. For example, a particular application may require that a machine efficiently and accurately dispense materials ranging from less than one cc to many gallons. However, although the industry is calling for more exacting machine performance, it is also requiring that the equipment design be simple, straightforward and capable of being operated by production personnel or conveniently integrated with automation devices such as robots and conveyor systems. Problems currently exist because many prior art metering, mixing and dispensing machines are immobile, requiring that the work be brought to the machine, which often is inefficient and impractical.

Moreover, the design of many of the prior art metering, mixing and dispensing machines, due to their bulky nature and resultant inability to position the machines in close proximity to the work, include lengthy hoses for transport of the metered and/or mixed material, the components of which often begin to react sometime before it is actually dispensed, which is undesirable. Rather, it is preferable that the material be metered and mixed as close as possible to the point of dispensing, to avoid premature reaction of the materials. Also, locating the metering and mixing components of the machine as close as possible to the dispensing point increases metering accuracy.

The closest known prior art to my liquid metering, mixing and dispensing gun is the proportionate metering unit manufactured by Naka Seiki Co., Ltd., of Japan. However, the structure of this unit is completely different than any improved dispensing gun.

Thus, the need exists for an improved liquid metering, mixing and dispensing machine in which plural component materials are metered and mixed adjacent to the point of dispensing thereof, and which is portable enough to be handled by a human operator or easily integrated with automation systems.

SUMMARY OF THE INVENTION

Objectives of the invention include providing a liquid metering, mixing and dispensing gun in which plural component liquids are metered and mixed adjacent to the dispensing location.

Another objective of the invention is to provide such a liquid metering, mixing and dispensing gun which is portable and easily handled by a human operator, and which can be conveniently integrated into automation systems.

A further objective of the invention is to provide such a liquid metering, mixing and dispensing gun in which the gun is reloaded without the use of an inlet check valve, and in which backflow problems are virtually eliminated.

Still another objective of the invention is to provide such a liquid metering, mixing and dispensing gun which can dispense liquids having a wide range of viscosities and cure times.

A still further objective of the invention is to provide such a liquid metering, mixing and dispensing gun which allows for accurate volume and rate variability, and which can accurately dispense materials comprised of components having widely varying ratios.

Another objective of the invention is to provide such a liquid metering, mixing and dispensing gun in which solvent purging of the mixer thereof is eliminated by the use of a disposable mixer.

A further objective is to provide such a liquid metering, mixing and dispensing gun which has low internal pressure, and which is accurate in dispensing low volume output shots which are consistent and reliable, portable for accessing heretofore inaccessible locations, and is lightweight, compact, and durable.

These objectives and advantages are obtained by the gun for metering, mixing and dispensing at least one liquid material, the general nature of which may be stated as including, at least one chamber having front and rear compartments, with said rear compartment being formed with a liquid material inlet opening for communicating with a source of the liquid material, said chamber further being formed with a material passage opening for communication between the front and rear compartments, and an aligned material outlet opening formed in the front compartment for passage of the material out of the gun, a rod having front and rear ends slidably and sealingly mounted by its rear end to an opening formed in the rear compartment of the chamber, the opening being aligned with the material passage opening of the chamber, pump means for moving the front end of the rod between a positive displacement position wherein said front end of the rod is sealingly engaged with the material passage opening and extends into the front compartment of the chamber, and a retracted position wherein the front and rear compartments communicate through the material passage opening, means for driving the pump means, adjustment means operatively connected to the pump means for controlling the length of stroke of the attached rod, valve means mounted adjacent to the chamber outlet opening to prevent unintended passage of material out of or back through the outlet opening and mixer means mounted adjacent to the outlet opening for mixing the metered material to be dispensed.

BRIEF DESCRIPTION OF THE DRAWINGS

A preferred embodiment of the invention, illustrative of the best mode in which applicant has contemplated applying the principles, is set forth in the following description and is shown in the drawings and is particularly and distinctly pointed out and set forth in the appended claims.

Similar numerals refer to similar parts throughout the drawings.

DESCRIPTION OF THE PREFERRED EMBODIMENT

The liquid metering, mixing and dispensing gun of the present invention is indicated generally at 1, and is shown in FIGS. 1-4. Gun 1 is primarily intended for metering, mixing and dispensing plural component liquid materials, and in particular two-component liquid materials such as reactive resins, for use in a wide range of manufacturing processes such as resin transfer molding, electrical potting and encapsulation, structural bonding, sealing, casting and filling. However, if desired, gun 1 can be used for accurately metering, mixing and dispensing a single component material. The dispensing of such liquid materials is useful in the manufacture of many everyday products, such as transformers, cable connectors, descrambler modules and components for the telecommunications industry.

Figure 4:
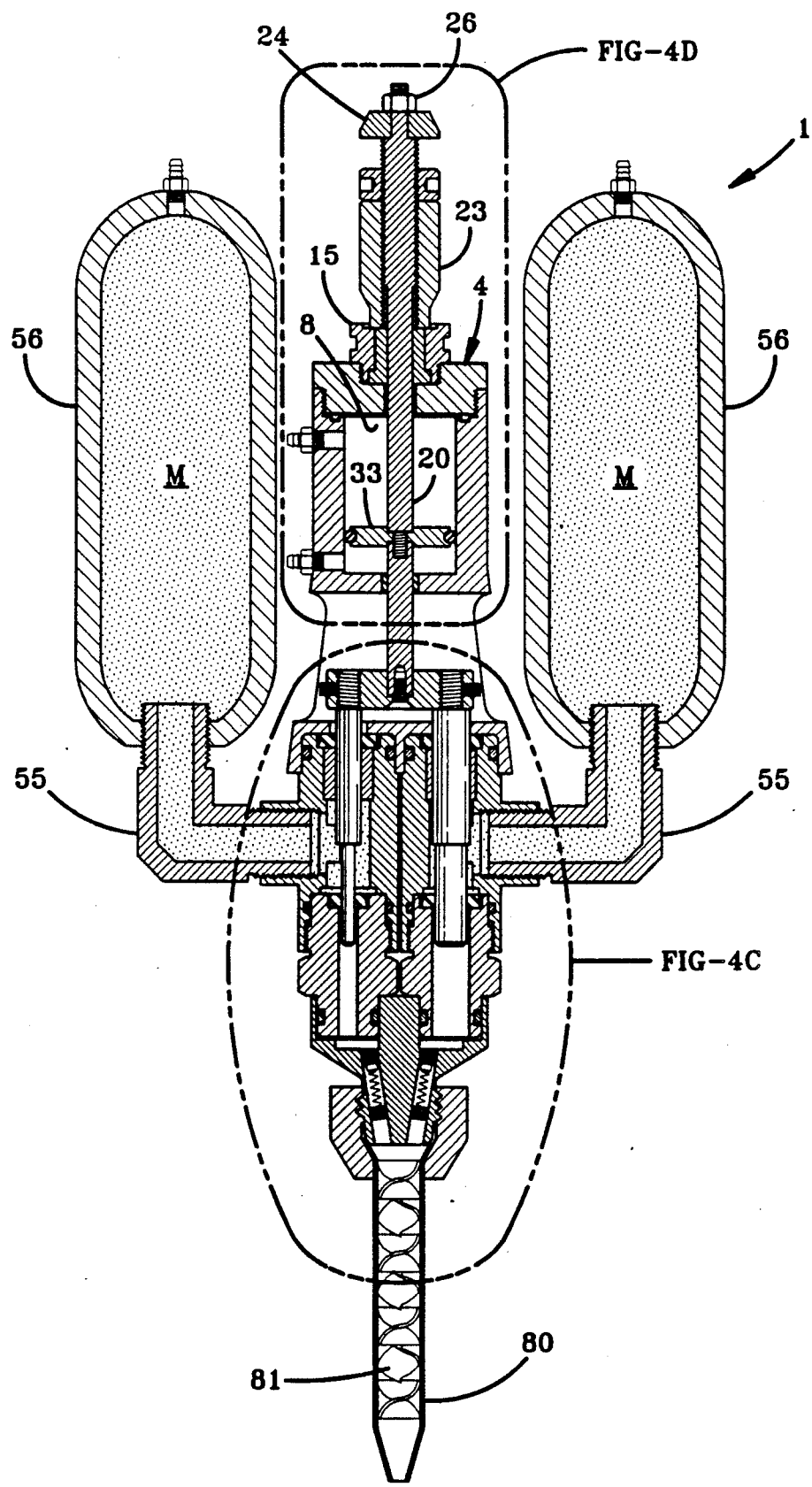
FIG. 4 is a sectional view taken on lines 4—4, FIG. 3.

Gun 1 includes a body indicated generally at 2 (FIGS. 1-4). Body 2 includes a handle 3 and a rearwardly extending pump cylinder 4 as shown in FIG. 4. Cylinder 4 comprises a sidewall 5 and front and rear walls 6 and 7, respectively, which together define a compartment 8. Rear wall 7 is threadably engaged with sidewall 5 for access to compartment 8 should maintenance or repair of the gun ever become necessary. Front and rear walls 6 and 7 of cylinder 4 are formed with aligned openings 9 and 10, respectively. A bearing 14 is press-fitted into front wall opening 9, and another bearing 15 is threadably engaged with an increased diameter threaded portion of rear wall opening 10. A pair of threaded openings, referred to collectively as 11 and individually as 11a and 11b, are formed in sidewall 5 of cylinder 4 and have a pair of nipples 12 threadably engaged therewith and secured in place by nuts 13. The nipples 12 are normally connected to elbow connectors or the nipples may be elbow connectors, or other types of connecting members for pressurized air lines may be used.

A piston rod 20 (FIGS. 1-4) is slidably mounted in aligned bearings 14 and 15, and includes front and rear ends 21 and 22 which extend outwardly of front and rear walls 6 and 7 of cylinder 4. Rear end 22 is threaded and has a knurled nut 23 adjustably threadably engaged therewith which acts as a mechanical stop for regulating the travel distance of piston rod 20, as will be described in greater detail below in the description of the operation of gun 1. A stop member 24 is press fitted on a reduced diameter shoulder 25 formed on rear end 22 of rod 20, to prevent stop nut 23 from being threadably moved off of the rear end of the rod. Stop member 24 itself is further secured on rod 20 by a nut 26 which is threadably engaged with the reduced diameter portion of the rod. A lock nut 27 formed with a plurality of keyways 28 in its outer circumference, is threadably engaged with rear end 22 of piston rod 20 and is positioned intermediate stop nut 23 and stop member 24, for securely locking stop nut 23 in a desired position using a key (not shown). A piston 33 is connected to an intermediate portion 34 of two-piece piston rod 20 and is formed with a groove 35 in its outer circumference. A usual elastomeric seal 36 is mounted in groove 35 and seals piston 33 to the interior of sidewall 5 of cylinder 4. The two-piece piston rod 20 preferably has its intermediate portion threadably connected at its ends into the piston 33.

Front end 21 of piston rod 20 is formed with a threaded end opening 37, and the front end of the rod is seated in a threaded opening 38 formed in a cross beam 39 (FIGS. 1-4). A screw 40 passes through cross-beam opening 39 and is threadably connected to the end of piston rod 20 to secure the piston rod to the crossbeam. A pair of openings 41 are formed in the ends of cross beam 39, and receive a rear end 42 of a pair of positive displacement rods referred to collectively as 43, and individually as 43a and 43b. Each rod 43 is secured in its respective opening 41 and attached by its end to cross beam 39 by threaded connections formed in the cross beam. The displacement rods 43a and 43b thus threadably engage cross beam 39 and set screws 44 (FIG. 2) lock down phasing adjustments for displacement rods 43a and 43b.

Phasing is critical to this apparatus and fully capable of attainment. Phasing is the ability to change the point at which one displacement rod seals in respect to the other. Since the seals are positioned in an unadjustable manner, the displacement rod is adjustable. Upon loading with material to be dispensed, if one pump should start dispensing prior to the other, they can be balanced as required. The lagging pump displacement rod is unthreaded to start material flow simultaneously with the other pump. Once adjusted, set screw 44 retains the location of this position.

Figure 1:
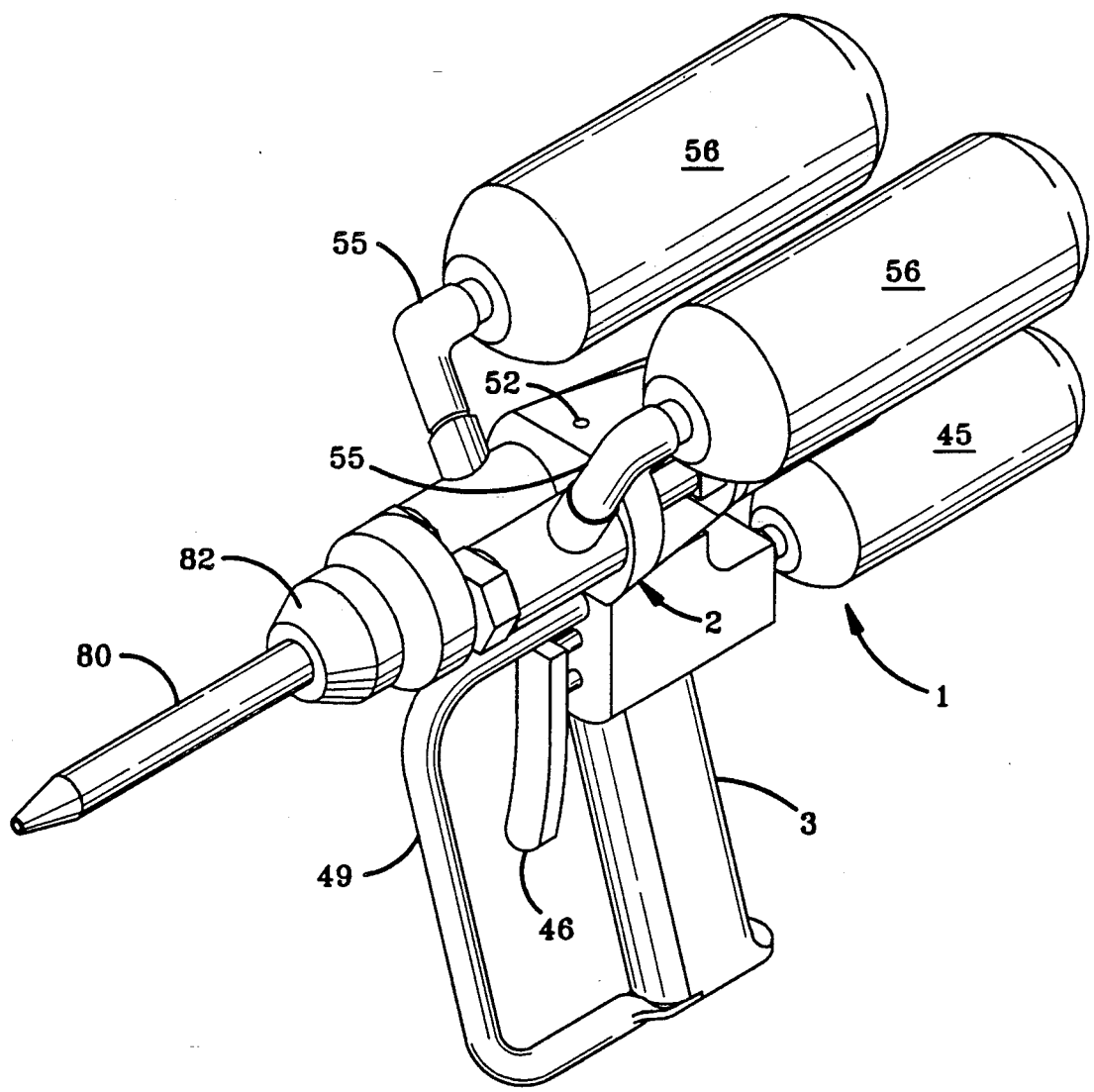
FIG. 1 is a perspective view of the liquid metering, mixing and dispensing gun of the present invention.
Figure 2:
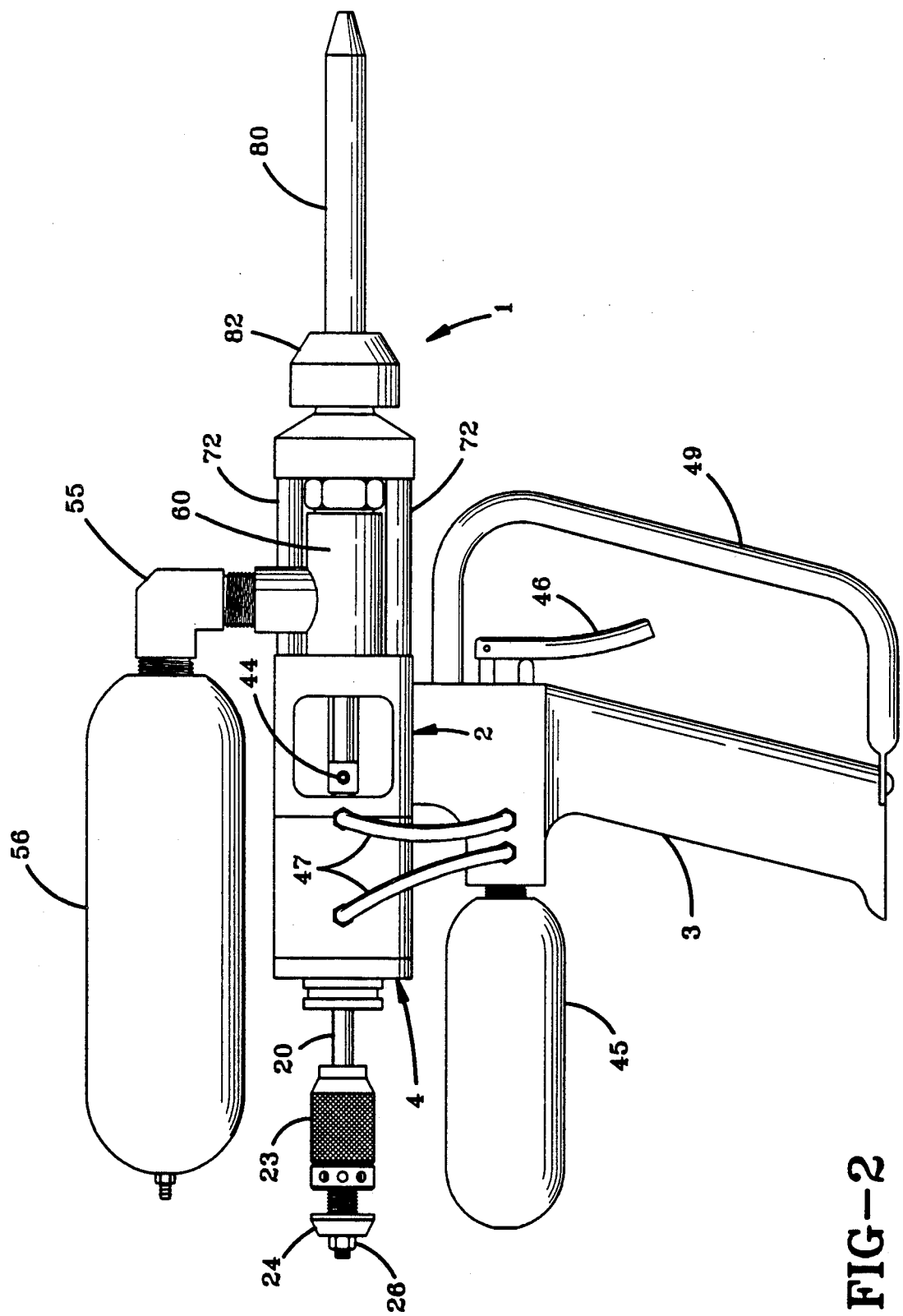
FIG. 2 is an elevational side view of the gun shown in FIG. 1.
Figure 3:
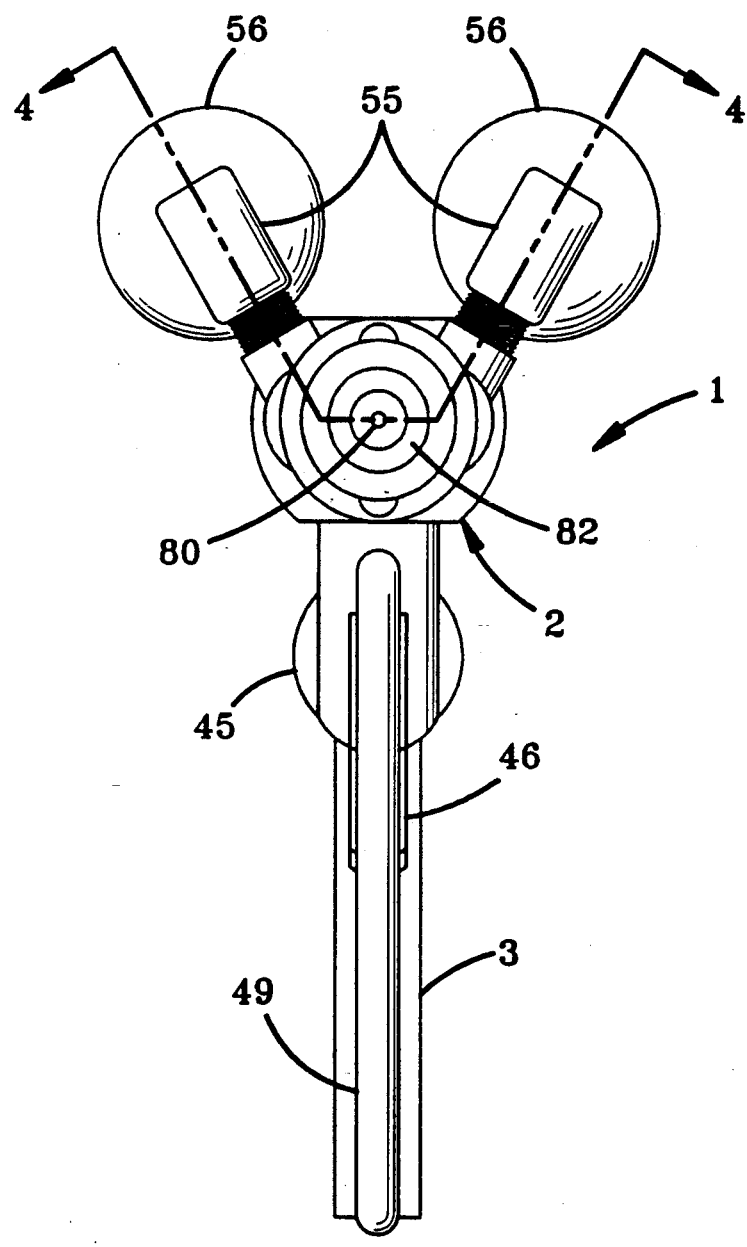
FIG. 3 is an elevational front view of the gun shown in FIGS. 1 and 2.

A portable pressurized pneumatic cartridge 45 (FIGS. 1 and 2) of a type which is well known in the art is attached to and communicates with an opening formed in handle 3. Valves (not shown) mounted within handle 3 and controlled by trigger 46, control the flow of air through hoses 47 and to and out of openings 11 formed in cylinder sidewall 5, for pneumatically driving piston 33 within the cylinder for moving piston rod 20 back and forth. Trigger 46 has a surrounding support handle and guard 49 as shown in FIG. 1 and 2.

A pair of cylinders, referred to collectively as 50 and individually as 50a and 50b, is formed on an intermediate area of the gun with a groove 51 on a rear end thereof, and are attached to body 2 of gun 1 by set screws 52 (FIG. 1) which pass through openings formed in the body and engage grooves 51 (FIG. 4) to retain cylinders 50 thereon (FIGS. 1–4). Cylinders 50 are similar, so that only cylinder 50a will be described in detail herein. Cylinder 50a is formed with a central bore 53 and a material inlet opening 54 in its sidewall. An elbow connector 55 is threadably engaged with inlet opening 54 by one of its threaded ends. A portable pressurized cartridge 56 containing one of the components of a two-component liquid material "M", such as a reactive resin, is attached to the other threaded end of elbow 55. Rods 43a and 43b are sealed within bores 53a and 53b only by seals 58a and 58b. Bearings 57a and 57b are required to provide proper alignment only.

A second pair of cylinders, referred to collectively as 60 and individually as 60a and 60b, is threadably engaged with the front ends of cylinders 50a and 50b, respectively (FIGS. 1–4). Cylinders 60a and 60b are similar in structure, so that only cylinder 60a will be described herein. Cylinder 60a is formed with a central bore 61 for slidably receiving a front end 62 of rod 43a, which is sealed to cylinder bore 61 by a usual seal 63.

A groove 64 is formed in the front end of each cylinder 60 for engaging a flange 70 of a nose cap 71, for seating the nose cap on the cylinders. Nose cap 71 is secured to a pair of frontwardly extending shafts 72 (FIG. 2) which extend frontwardly from body 2 of gun 1, by any suitable retention means. Nose cap 71 is formed with a pair of bored openings therein, referred to collectively as 73 and individually as 73a and 73b, which communicate with central bores 61 of cylinders 60a and 60b, respectively. A usual ball and spring check valve 75 is mounted within each bored opening 73 of nose cap 71. A disposable static mixer 80 of the type manufactured by the assignee of the present invention, and having helical mixing elements 81 mounted therein, is attached to the end of nose cap 71 by a nut 82 which threadably engages the nose cap.

Figure 4A:
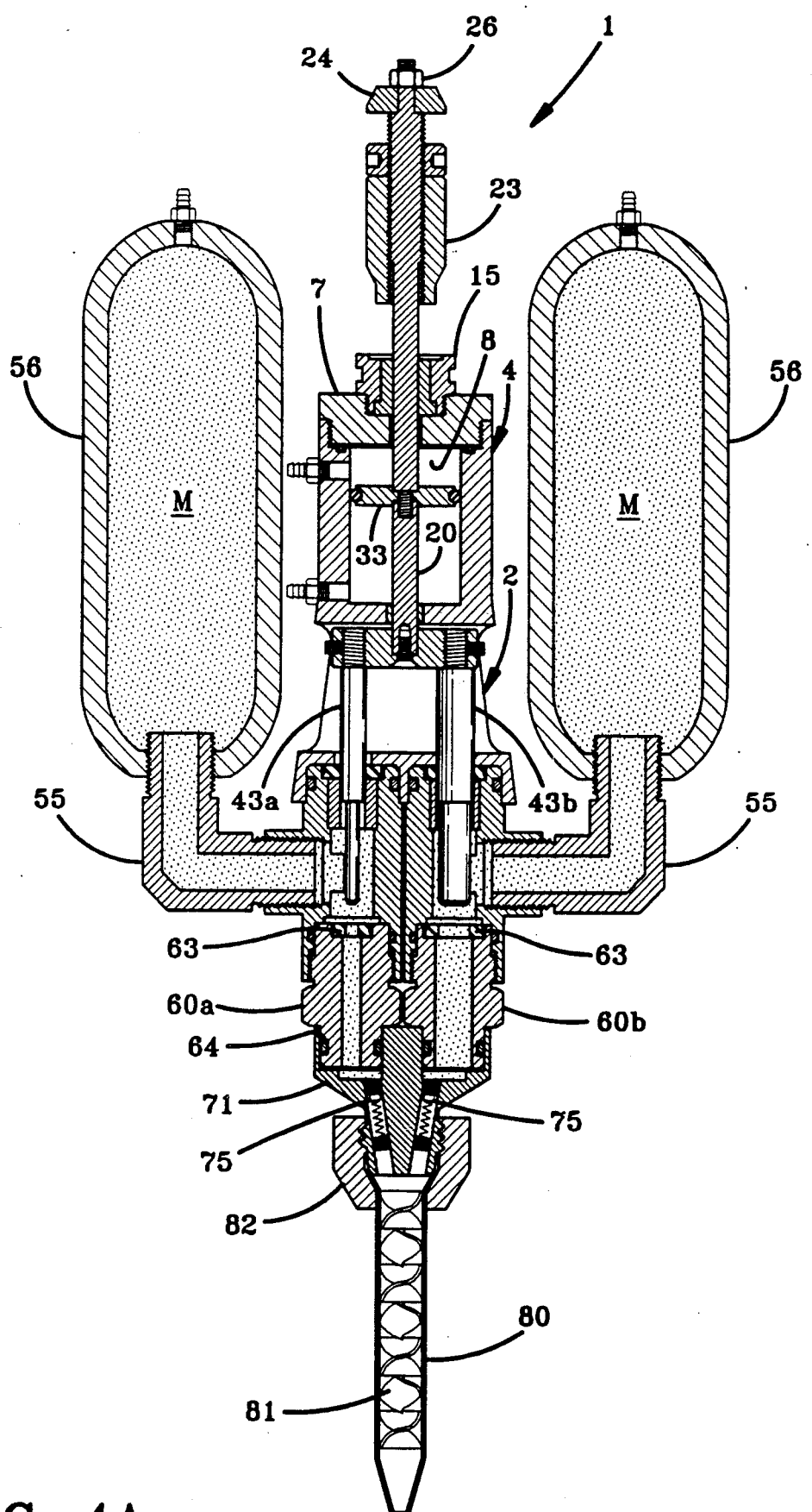
FIG. 4A is a sectional view similar to FIG. 4, showing the gun components in a retracted refilling position.

Gun 1 of the present invention operates in the following manner. As shown in FIG. 4a, when trigger 46 is not manually depressed, positive displacement rods 43a and 43b are in the retracted position as pressurized pneumatic cartridge 45 is passing air through cylinder opening 11a and into cylinder compartment 8 forcing piston 33 and attached piston rod 20 rearwardly to its fully retracted position. When the gun components are in the fully retracted position, portable cartridges 56 each containing one component of a two-component liquid material such as a reactive resin, force the material contained therein through elbow connectors 55 and into cylinders 50a and 50b. It is important to note that the loading of material in cylinders 50 is achieved without the use of an inlet check valve as in many prior art dispensing machines, since rods 43 are retracted out of sealing engagement with bore 61 of cylinder 60. Stop nut 23 is adjusted either forwardly or rearwardly to determine the distance of travel of piston rod 20 and attached rods 43, which increases or decreases the volume of liquid material displaced. If desired, the rate of movement of piston rod 20 can be varied by adjusting a flow control valve, which is attached to and regulates the exhaust of air from pump cylinder opening 11b.

Varying the rate, in turn, controls the rate of material dispensed by the gun. Mechanical stop nut 23 is locked in place by lock nut 27 in the manner described above, and the gun now is ready to meter, mix and dispense the liquid material, either one or two components.

Figure 4B:
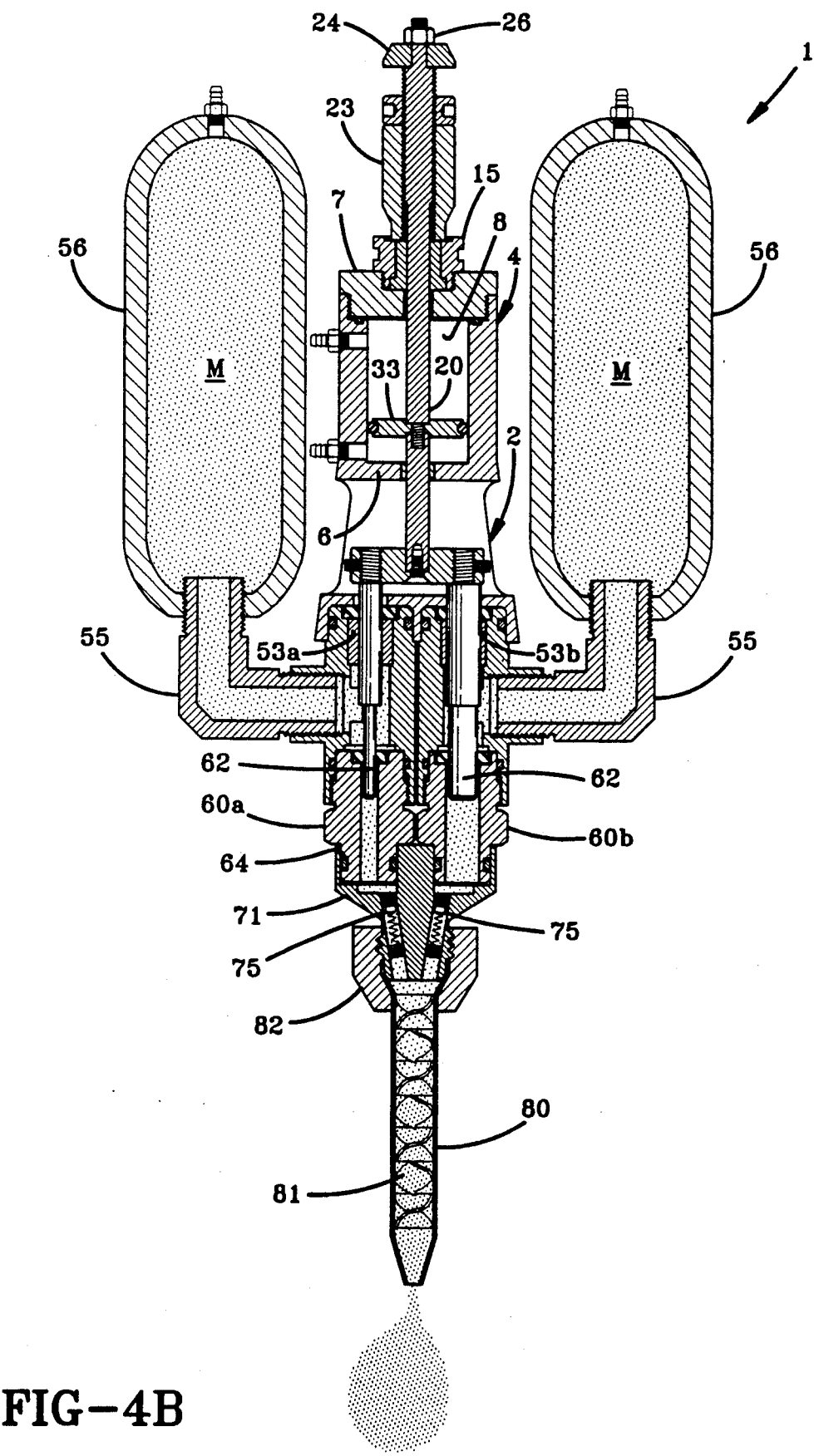
FIG. 4B is a view similar to FIG. 4A, showing the gun components in a positive displacement position, and ejecting a two-component metered material from the end of an attached mixer.
Figure 4C:
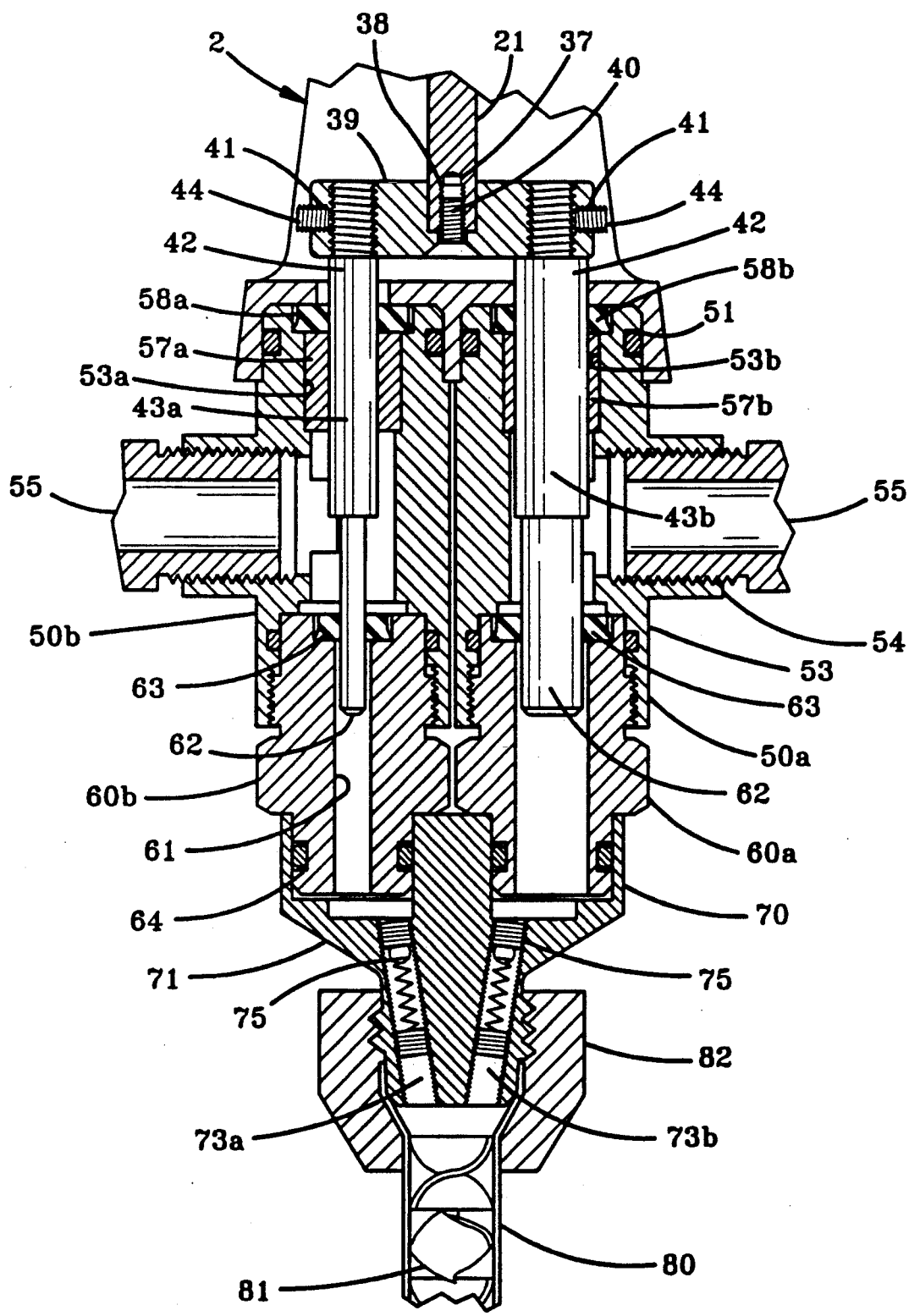
FIG. 4C is an enlarged area of FIG. 4.
Figure 4D:
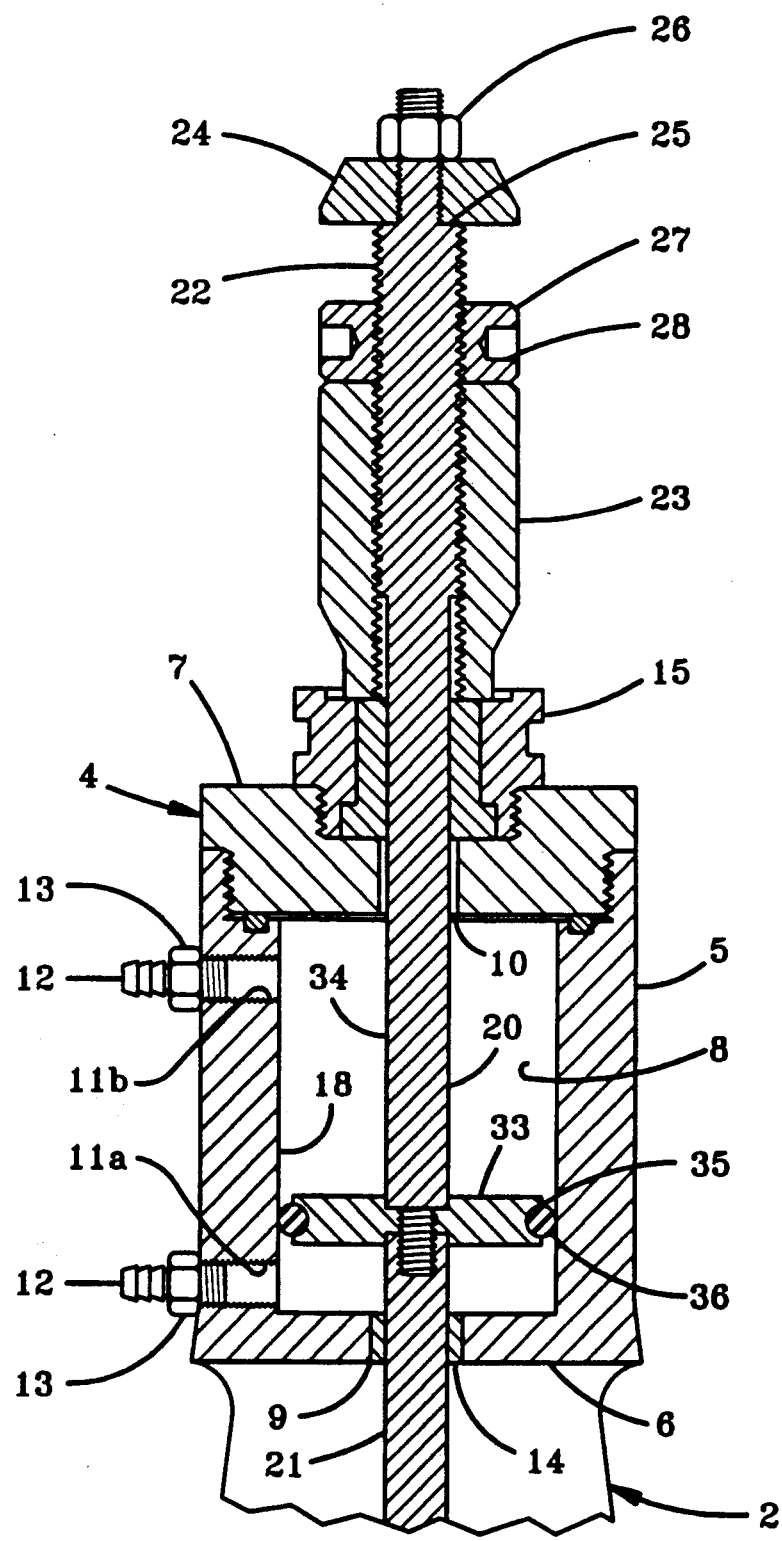
FIG. 4D is an enlarged area of FIG. 4.

As shown in FIG. 4B, when trigger 46 is manually pulled, pressurized air flows through pump cylinder opening 11b, forcing piston 33 and attached piston rod 20 and positive displacement rods 43 forwardly. Positive displacement rods 43, the front end 62 of which have different diameters for dispensing varying fixed ratios of the individual components of the liquid material to be dispensed, move into central bores 61 of their respective cylinders 60, and positively displace the loaded material contained therein with enough force to overcome the bias of check valves 75. As the individual components pass through bores 73 formed in nose cap 71, they enter static mixer 80 and move pass the helical mixing elements 81 contained therein to thoroughly mix the metered material. The metered and mixed material then is dispensed out of the delivery end tip of mixer 80, usually in small shot sizes of less than 1 cc. FIG. 4a shows the retracted refilling position of the dual delivery pistons 43a and 43b prior to delivery of the two liquid materials into the metering cylinders 60a and 60b. FIG. 4b shows the dual delivery pistons 43a and 43b in a positive displacement forward position injecting the two-component metered material into the delivery nozzle and onto a work station on location.

In accordance with one of the main features of the present invention, it is important to note that attachment of the mixer elements 81 adjacent to check valves 75 increases metering accuracy since the positive displacement rods 43a are located very close to the dispensing location. The phasing adjustment of delivery of the two materials has been described supra as to how the pair of displacement rods are locked into proper settings for dispensing the several components. Their ratios can be varied as desired for proper mixing and reaction. Whenever a single component type of material is dispensed, the use of a mixer is unnecessary. In that case a needle or tubular nozzle without mixing elements is used. The static mixer is used for the dual component materials.

It is understood that the drive for positive displacement rods 43 can be independent, and the front ends 62 of rods 43 and the diameter of the opening of seals 63 can be varied, so that many fixed ratios of two-component materials can be accommodated by gun 1. In addition, materials having viscosities ranging from thin liquids to pastes can be metered by using the proper size, seat and spring weight check valve.

It is further understood that liquid material can be fed into cylinders 50 by gravity as well as by pressure, depending on the viscosity of the material being dispensed. It is understood that an electric drive system utilizing adjustable limits which is employed to vary piston rod travel distance can be used in place of the preferred pneumatic pump and stop nut shown and described above. The electric drive utilizes a stepper motor with a lead screw cylinder so that distance and rate variability can be achieved through programming of the motors. The flexibility and accuracy of the electric drive also would enable the system to achieve variable ratio control, as opposed to the more limiting fixed ratio of control described above. More particularly, by independently driving two or more pumps, a desired ratio can be achieved by driving the pumps at different rates.

The close proximity of the mixer to the metering components of the gun increases accuracy of the gun over most prior art dispensing equipment which usually attach a mixer at a location remote from the metering pumps. In addition, disposable mixers eliminate the need for solvent purging as required in many prior art dispensing machines.

Again, the important features of the metering, mixing and dispensing gun of the present invention is that plural-component liquids are metered and mixed adjacent to the dispensing location thereof for increased accuracy which is especially important when dispensing small volumes of material. Another important feature of the gun of the present invention is that its portability enables it to be easily handled by a human operator, or to be conveniently integrated into automation systems.

Other important features include providing a liquid material dispensing gun in which the gun is reloaded without the use of inlet check valves as in many prior art dispensing machines, and backflow is virtually eliminated. Also, the gun is capable of dispensing liquids having a wide range of viscosities and cure times, and provides for accurate volume and rate variability, and also can accurately dispense materials comprised of components having widely varying ratios. Moreover, solvent purging of the mixer is used with the gun is eliminated by the use of a disposable mixer. Thus, the liquid metering, mixing and dispensing gun has low internal pressure, is accurate in dispensing low volume output shots, consistent, portable for accessing heretofore inaccessible locations, lightweight, compact and durable.

Accordingly, the liquid metering, mixing and dispensing gun of the present invention is simplified, provides an effective, safe, inexpensive, and efficient gun which achieves all the enumerated objectives, provides for eliminating difficulties encountered with prior dispensing equipment, and solves problems and obtains new and improved results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved liquid metering, mixing and dispensing gun is constructed and used, the characteristics of the construction, and the advantageous, new and useful results obtained; the new and useful structures, devices, elements, arrangements, parts and combinations, are set forth in the appended claims.

I claim:

1. A gun for metering, mixing and dispensing at least two liquid materials, said gun comprising:
   a) a pair of adjacent chambers each having front and rear compartments, with said rear compartments each being formed with a liquid material inlet opening for communicating with a respective one of the liquid materials, each of said chambers further being formed with a material passage opening for communication between the front and rear compartments, and an aligned material outlet opening formed in each of the front compartments for passage of the materials out of the front compartments;
   b) a material displacement rod having front and rear ends slidably sealingly mounted by its rear end within an opening formed in the rear compartment of each of the said chambers, said rear opening being aligned with the material passage opening of each of the said chambers;
   c) pump means for moving the front ends of the rods between a positive displacement position wherein said front ends of said rods are sealingly engaged with the material passage openings and extend into the front compartments of the chambers, and a retracted position wherein the rods are out of sealing engagement with the material passage openings and the front and rear compartments communicate through the material passage openings, said pump means having a single piston rod operatively connected to the rear ends of the material displacement rods for simultaneously moving both of said rods to ensure simultaneous movement of the two liquid materials through their respective passage openings upon actuation of the pump means;
   d) means for driving the said pump means;
   e) adjustment means operatively connected to the pump means for controlling the length of stroke of the rods;
   f) valve means mounted adjacent to each of the chamber outlet openings of the front compartments to prevent unintended passage of the two liquid materials out of or back through their respective outlet openings; and
   g) mixer means mounted adjacent to the outlet openings for mixing the two materials to be dispensed simultaneously through the outlet openings and directly into the mixer means.

2. The gun defined in claim 1 in which the said pump means includes a cylinder formed with aligned front and rear openings and a pair of fluid openings; in which the piston rod has front and rear ends and is slidably mounted within the aligned front and rear openings of the said cylinder; in which the front and rear ends of the said piston rod pass through and outwardly of the front and rear openings, respectively; and in which a piston is attached to an intermediate portion of the said piston rod and is moved by the fluid passing into and out of the fluid openings.

3. The gun defined in claim 2 in which the rear end of the said piston rod is threaded; and in which the adjustment means is a mechanical stop threadably adjustably engaged with the rear end of the said rod for regulating the distance of travel of said rod and its attached material displacement rods.

4. The gun defined in claim 2 in which the means for moving the pump means is a pressurized air cartridge; in which the said cartridge is mounted on the gun and communicates with the fluid openings formed in the pump means cylinder; and in which a manually operated trigger attached to a handle of the gun is operatively connected to second valve means for opening and closing the fluid openings for driving the said piston rod in opposite directions within the cylinder.

5. The gun defined in claim 1 in which the two liquid materials are contained in a pair of pressurized cartridges which are attached to respective gun chambers and communicate with their respective rear compartments through their respective liquid material inlet openings.

6. The gun defined in claim 1 in which the said valve means is a check valve mounted within a nose attachment for the gun.

7. The gun defined in claim 6 in which the said mixer means is a disposable static mixer; and in which the said mixer is mounted on the nose attachment.

* * * * *